US011821797B2

(12) United States Patent
Hsu et al.

(10) Patent No.: US 11,821,797 B2
(45) Date of Patent: Nov. 21, 2023

(54) TEMPERATURE SENSING DEVICE AND METHOD FOR A HOT STAMPING DIE APPARATUS

(71) Applicant: METAL INDUSTRIES RESEARCH & DEVELOPMENT CENTRE, Kaohsiung (TW)

(72) Inventors: Tai-Hsin Hsu, Kaohsiung (TW); Bing-Chuen Hu, Kaohsiung (TW); Wan-Ling Chen, Kaohsiung (TW); Kai-Min Tang, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 367 days.

(21) Appl. No.: 17/114,555

(22) Filed: Dec. 8, 2020

(65) Prior Publication Data

US 2022/0178770 A1 Jun. 9, 2022

(51) Int. Cl.
*G01K 13/10* (2006.01)
*G01K 13/06* (2006.01)

(52) U.S. Cl.
CPC ............. *G01K 13/10* (2013.01); *G01K 13/06* (2013.01)

(58) Field of Classification Search
CPC ...................................................... G01K 13/06
USPC ............................................................ 374/141
See application file for complete search history.

(56) References Cited

U.S. PATENT DOCUMENTS 9,302,306 B2 * 4/2016 Matsumoto .............. G01K 1/14

* cited by examiner

*Primary Examiner* — Natalie Huls
*Assistant Examiner* — Sharad Timilsina
(74) *Attorney, Agent, or Firm* — WPAT, P.C (57) ABSTRACT

A temperature sensing device for a hot stamping die apparatus includes: a processor, wherein when a second die moves toward a first die to press a workpiece, a pushing signal is transmitted to the processor; at least one temperature sensing unit is disposed in the first die and includes: a moving rod, a buffer, and a temperature sensor; a displacement regulator; and a controller, whereby when the processor receives the pushing signal, the processor controls the displacement regulator through the controller, so that the moving rod drives the buffer and the temperature sensor to move a predetermined distance, and further the temperature sensor moves toward the workpiece to touch the workpiece and sense a temperature of the workpiece.

8 Claims, 6 Drawing Sheets

FIG. 6

TEMPERATURE SENSING DEVICE AND METHOD FOR A HOT STAMPING DIE APPARATUS

BACKGROUND

Technical Field

The present disclosure relates to a temperature sensing device for a hot stamping die apparatus, and in particular, to a temperature sensing method for a hot stamping die apparatus.

Related Art

Hot stamping is mainly a method for forming a component through a die apparatus by using features of metal in a high temperature state, that is, plasticity and malleability are improved rapidly, and yield strength is decreased rapidly. In general, hot stamping is first heating manganese boron steel to 850° C. to 950° C., after completing austenitization on a steel plate, rapidly moving the steel plate to a hot stamping die apparatus for forming, and quenching the steel plate to martensite, wherein strength of the quenched steel plate may reach more than 1500 MPa. Because after being formed at a high temperature, the steel plate needs to be subject to an in-die quenching process immediately, a temperature in the hot stamping die apparatus may affect a structural change of the steel plate after quenching.

In a hot stamping process, usually, an in-die temperature cannot be monitored, and in the hot stamping process, a quenching effect, workpiece performance, and a phase change curve cannot be determined, so that a manufacture yield cannot be controlled effectively. However, if a contact temperature sensor is used, the contact temperature sensor is fixedly disposed in an inner surface of a die to directly sense a temperature of a formed workpiece, needs to withstand high impact pressure, and is easily damaged. If a non-contact infrared temperature sensor is used, a temperature measurement error problem may occur during infrared sensing due to an irregular emissivity of a general metal material.

Therefore, a temperature sensing device and method for a hot stamping die apparatus need to be provided to resolve the foregoing problems.

SUMMARY

An objective of the present disclosure is to provide a temperature sensing device for a hot stamping die apparatus, wherein a contact temperature sensor using a linkage mode has a long service life, and has precise temperature sensing values.

In order to achieve the foregoing objective, the present disclosure provides a temperature sensing device for a hot stamping die apparatus, wherein the hot stamping die apparatus comprises a first die and a second die, the second die is configured to move to the first die relatively, and the temperature sensing device comprises: a processor, wherein when the second die moves toward the first die to press a workpiece, a pushing signal is transmitted to the processor; at least one temperature sensing unit, disposed in the first die, and comprising: a moving rod; a buffer, having an end connected to the moving rod; and a temperature sensor, connected to the other end of the buffer, and electrically connected to the processor; a displacement regulator, configured to drive the moving rod, and enable the moving rod to move to the displacement regulator relatively; and a controller, coupled to the displacement regulator, and electrically connected to the processor, whereby after the processor receives the pushing signal, the processor controls the displacement regulator through the controller, so that the moving rod drives the buffer and the temperature sensor to move a predetermined distance, and further the temperature sensor moves toward the workpiece to touch the workpiece and sense a temperature of the workpiece.

The present disclosure further provides a temperature sensing method for a hot stamping die apparatus, comprising: providing a hot stamping die apparatus, comprising a first die and a second die, wherein the second die is configured to move relative to the first die; transmitting a pushing signal to a processor when sensing that the second die moves toward the first die to press a workpiece; and moving, by a temperature sensor after the processor receives the pushing signal, toward the workpiece to touch the workpiece and sense a temperature of the workpiece, wherein the pushing signal is selected from a group consisting of a pressing signal of a pressing sensor and a timing signal of the processor.

The temperature sensing device of the present disclosure is configured to sense a temperature of the workpiece when the hot stamping die apparatus presses the workpiece, link the controller by using the pressing signal of the pressing sensor or the timing signal of a process controller, and enable, through the displacement regulator and the moving rod, a temperature sensing unit to touch the workpiece during pressing. If a moving distance of the moving rod exceeds an original distance between the temperature sensor and the workpiece, extra movement is absorbed through internal contraction of the buffer. Compared with the contact temperature sensor (the impact force borne on the contact temperature sensor is determined by pressing of the second die on the first die, and the damage rate of the contact temperature sensor in a hot stamping die apparatus increases with the impact force) and a non-contact infrared temperature sensor (the emissivity change of the workpiece thereof causes a temperature measurement error problem during infrared sensing) in the prior art, a contact force between the contact temperature sensor of the present disclosure and a workpiece is controlled by using the controller and the displacement regulator each time, and the contact force of the present disclosure cannot be changed even if there is an impact force of the hot stamping die apparatus on the workpiece. Therefore, the contact temperature sensor of the present disclosure utilizes a linkage mode and has a long service life, and has precise temperature sensing values.

DETAILED DESCRIPTION

To make the foregoing objective, features, and characteristics of the present disclosure clearer and more comprehensive, detailed descriptions are provided below with reference to the accompanying drawings.

Figure 1A:
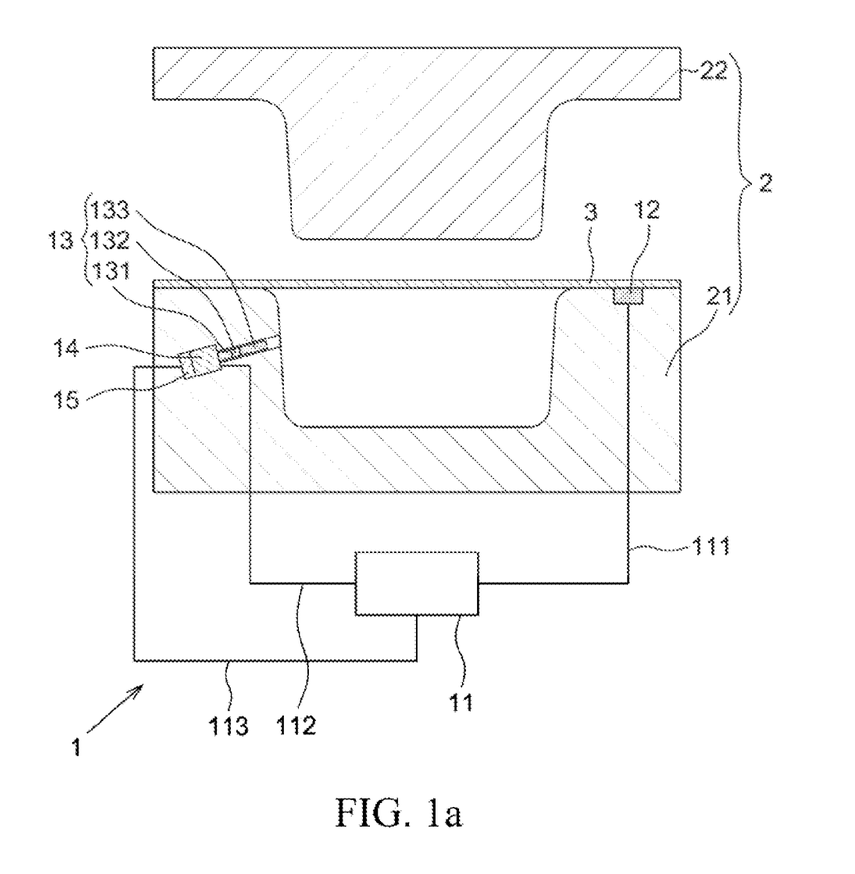
FIG. 1a is a schematic cross-sectional view of a temperature sensing device for a hot stamping die apparatus according to a first embodiment of the present disclosure before a workpiece is pressed.
Figure 1B:
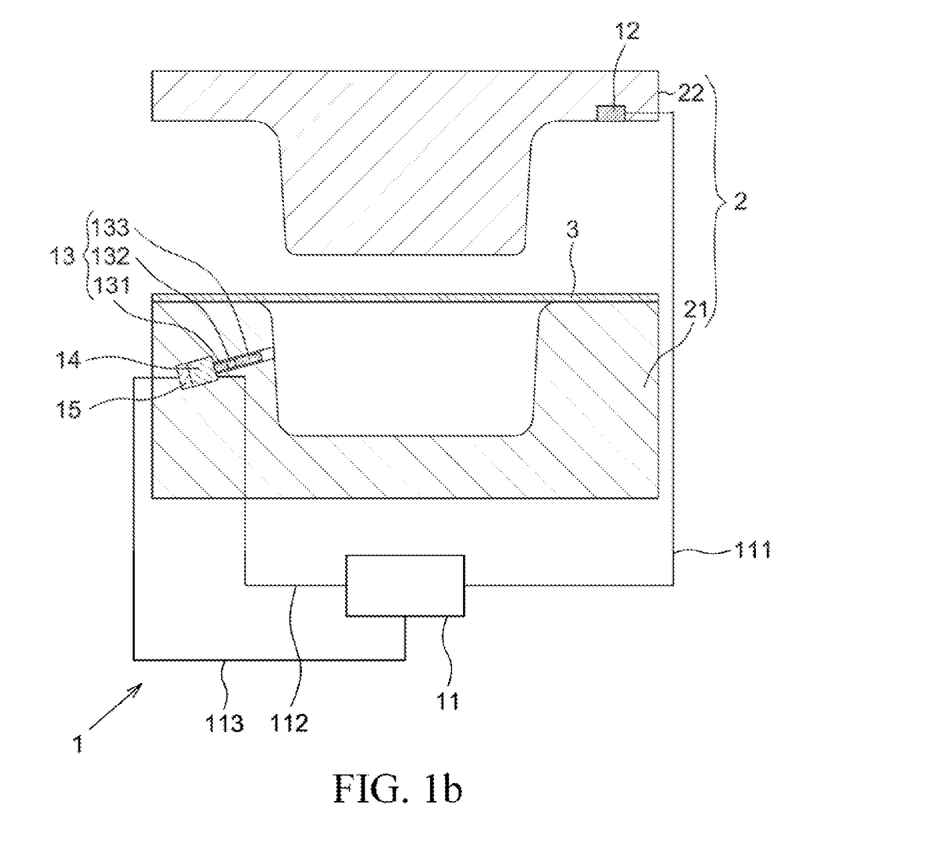
FIG. 1b is a schematic cross-sectional view of a temperature sensing device for a hot stamping die apparatus according to another aspect of the first embodiment of the present disclosure before a workpiece is pressed.
Figure 2:
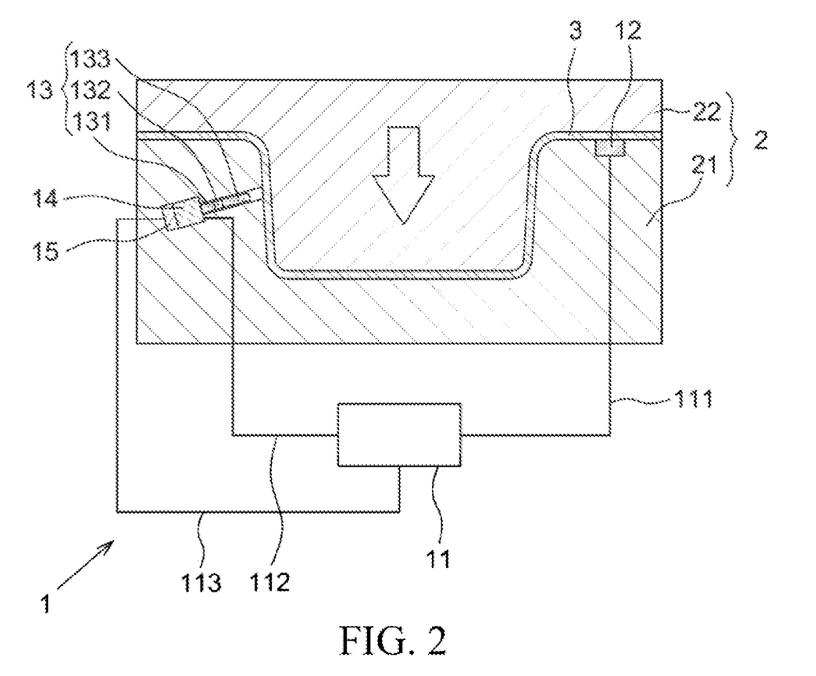
FIG. 2 is a schematic cross-sectional view of the temperature sensing device for a hot stamping die apparatus according to the first embodiment of the present disclosure when a workpiece is pressed.
Figure 3:
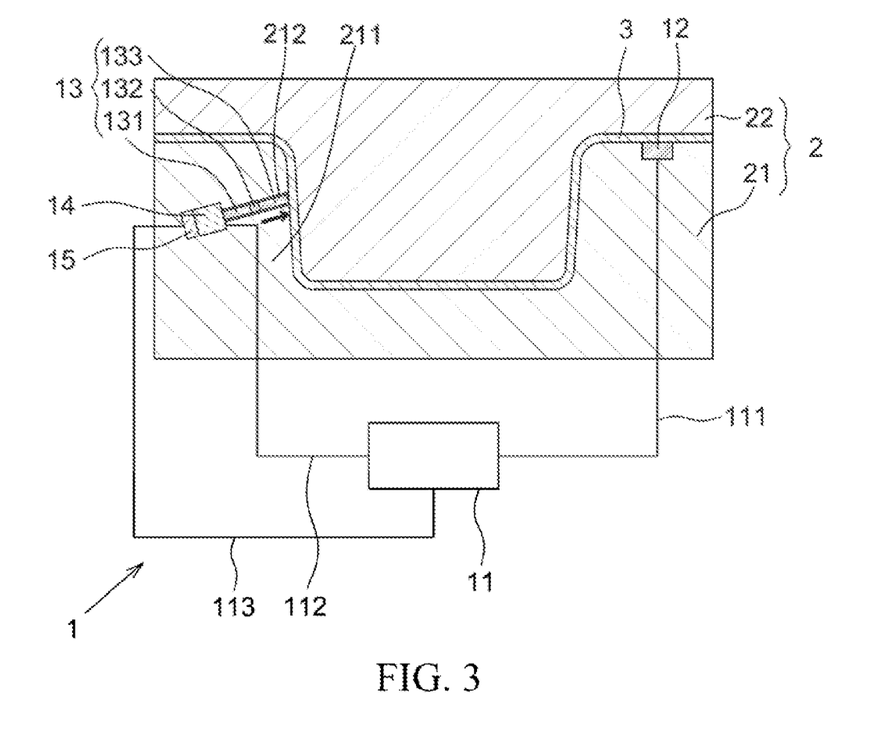
FIG. 3 is a schematic cross-sectional view of the temperature sensing device for a hot stamping die apparatus according to the first embodiment of the present disclosure after a workpiece is pressed.

FIG. 1a is a schematic cross-sectional view of a temperature sensing device for a hot stamping die apparatus according to a first embodiment of the present disclosure before a workpiece is pressed; FIG. 2 is a schematic cross-sectional view of a temperature sensing device for a hot stamping die apparatus according to an embodiment of the present disclosure when a workpiece is pressed. FIG. 3 is a schematic cross-sectional view of the temperature sensing device for a hot stamping die apparatus according to an embodiment of the present disclosure after a workpiece is pressed. Referring to FIG. 1a, a hot stamping die apparatus 2 includes a first die 21 and a second die 22, and the second die 22 is configured to move to the first die 21 relatively. A temperature sensing device 1 includes: a processor 11, at least one pressing sensor 12, at least one temperature sensing unit 13, a displacement regulator 14, and a controller 15. Referring to FIG. 2, the pressing sensor 12 is electrically connected to the processor 11 through a signal line 111. When sensing that the second die 22 moves toward the first die 21 to press a workpiece 3, the pressing sensor 12 transmits a pressing signal (that is, a pushing signal) to the processor 11. The pressing signal can be information about a distance between the second die 22 and the first die 21; or the pressing signal is information about pressure of the second die 22 on the first die 21. At least one pressing sensor 12 can be selected from a group consisting of a laser rangefinder, a pressure sensor, an ultrasonic distance sensor, and a combination thereof. In this embodiment, when the pressing sensor 12 is a pressure sensor, the pressing sensor 12 can be disposed on the first die 21 to directly touch the workpiece 3, as shown in FIG. 1a. In another embodiment, when the pressing sensor 12 is selected from a laser rangefinder and an ultrasonic distance sensor, the pressing sensor 12 can be disposed on the second die 22, as shown in FIG. 1b. Alternatively, the pressing sensor 12 can be disposed on the first die 21 at a position not covered by the workpiece 3.

Referring to FIG. 3, the temperature sensing unit 13 is disposed in the first die 21, and includes: a moving rod 131, a buffer 132, and a temperature sensor 133. An end of the buffer 132 is physically connected to the moving rod 131. The buffer 132 can be a spring. The temperature sensor 133 is physically connected to the other end of the buffer 132, and can be electrically connected to the processor 11 through a signal line 112. The displacement regulator 14 is configured to drive the moving rod 131, and enable the moving rod 131 to move to the displacement regulator 14 relatively. The displacement regulator 14 can be selected from a group consisting of a pneumatic cylinder, a servomotor, and a combination thereof. The controller 15 is coupled to (for example, is mechanically connected to or electrically connected to) the displacement regulator 14, and can be electrically connected to the processor 11 through a signal line 113, whereby after the processor 11 receives the pressing signal, the processor 11 controls the displacement regulator 14 through the controller 15, so that the moving rod 131 drives the buffer 132 and the temperature sensor 133 to move a predetermined distance, and further the temperature sensor 133 moves toward the workpiece 3 to touch the workpiece 3 and sense a temperature of the workpiece 3, as shown in FIG. 3. In other words, after the processor 11 receives the pressing signal, the processor 11 can transmit a processing signal to the controller 15, and the controller 15 moves the temperature sensing unit 13 according to the processing signal of the processor 11, so that the temperature sensor 133 touches the workpiece 3 and senses the temperature of the workpiece 3. When the displacement regulator 14 is a pneumatic cylinder, the controller 15 is a control valve, and the control valve is mechanically connected to the pneumatic cylinder, and can be configured to control a speed of increasing or decreasing air pressure in the pneumatic cylinder; and when the displacement regulator 14 is a servomotor, the controller 15 is a motor driver, and the motor driver is electrically connected to the servomotor, to control a forward speed or a reverse speed of the servomotor. A predetermined distance of the temperature sensor 133 can be specified by the controller 15 and the displacement regulator 14.

Referring to FIG. 3 again, the first die 21 includes a body 211 and a hole 212. The hole 212 is disposed in the body 211, and the hole 212 is configured to accommodate the temperature sensing unit 13. After the processor 11 receives the pressing signal, the temperature sensor 133 moves along an interior of the hole 212 to touch the workpiece 3 and sense the temperature of the workpiece 3. Feedback control of the processor 11 receiving the pressing signal is a kind of closed loop control. After the temperature sensor 133 touches the workpiece 3 and senses the temperature of the workpiece 3, the temperature sensor 133 transmits a temperature signal to the processor 11, and displays the temperature value to the hot stamping die apparatus 2 after operation. Then, the processor 11 transmits a processing signal to the controller 15, and the controller 15 enables the displacement regulator 14 to move the temperature sensing unit 13, and further enables the temperature sensor 133 to move along the interior of the hole 212 to return to an initial position (as shown in FIG. 1a). In addition, according to a large-size workpiece 3 or bends of the workpiece 3, a plurality of the temperature sensing units 13 can be selected and disposed at important positions in the first die 21, to sense the temperatures of the important positions of the large-size workpiece 3 and the temperatures of the bends of the workpiece 3.

Referring to FIG. 1a, FIG. 2, and FIG. 3 again, in this embodiment, when the pressing signal is the information about pressure of the second die 22 on the first die 21, only after the workpiece 3 is pressed, the processor 11 can transmit a processing signal to the controller 15, and the controller 15 enables the displacement regulator 14 to move the temperature sensing unit 13, so that the temperature sensor 133 can touch the workpiece 3 and sense the temperature of the workpiece 3 only after the workpiece is pressed. In this case, the pressing sensor 12 can be a pressure sensor.

Referring to FIG. 1a and FIG. 3 again, in another embodiment, when the pressing signal is the information about the distance between the second die 22 and the first die 21, the processor 11 transmits a processing signal to the controller 15 in advance before the workpiece 3 is pressed, and the controller 15 enables the displacement regulator 14 to move the temperature sensing unit 13 in advance, so that the temperature sensor 133 touches the workpiece 3 and senses the temperature of the workpiece 3 while pressing the workpiece 3. In this case, the pressing sensor 12 can be a laser rangefinder or an ultrasonic distance sensor.

Figure 4:
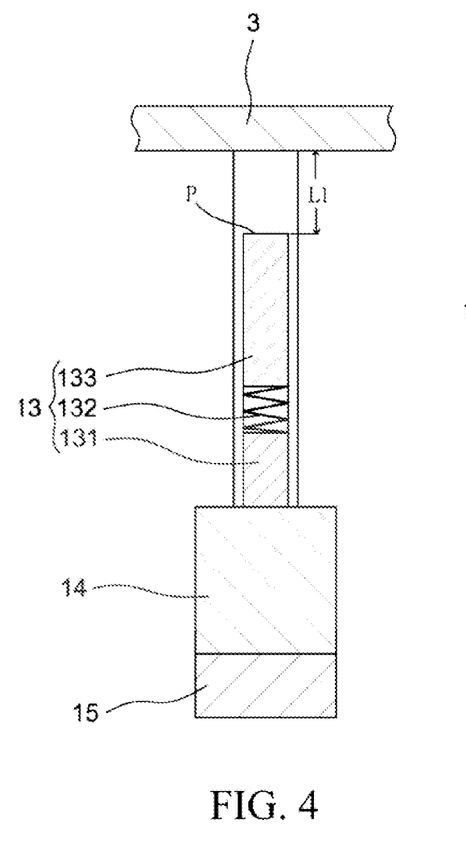
FIG. 4 is a schematic cross-sectional view of a temperature sensing unit according to the first embodiment of the present disclosure when a temperature sensor does not touch a workpiece.
Figure 5:
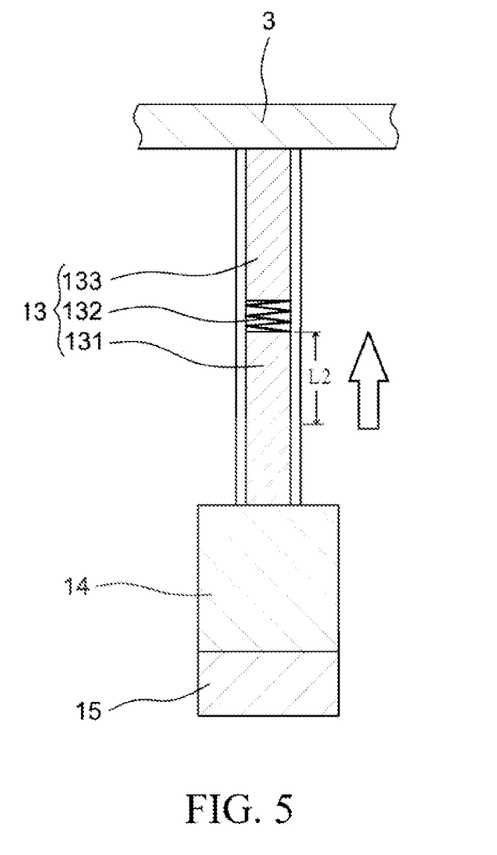
FIG. 5 is a schematic cross-sectional view of the temperature sensing unit according to the first embodiment of the present disclosure when a temperature sensor already touches a workpiece.

FIG. 4 is a schematic cross-sectional view of a temperature sensing unit according to an embodiment of the present disclosure when a temperature sensor does not touch a workpiece. FIG. 5 is a schematic cross-sectional view of a temperature sensing unit according to an embodiment of the present disclosure when a temperature sensor already touches a workpiece. When the distance L1 (as shown in FIG. 4) between an initial position P of the temperature sensor 133 and the workpiece 3 is less than the moving distance L2 (as shown in FIG. 5) of the moving rod 131, extra movement is absorbed through internal contraction of the buffer 132, to avoid a contact force between a probe of the temperature sensor 133 and the workpiece 3 from being excessively large and damaging the probe of the temperature sensor 133. In addition, the contact force between the probe of the temperature sensor 133 and the workpiece 3 does not vary with a pressing force of die stamping between the first die 21 and the second die 22. Therefore, the service life of the probe of the temperature sensor 133 of the present disclosure can be longer than that of a probe of a temperature sensor fixedly disposed in a die.

Embodiment 1: The displacement regulator 14 is a pneumatic cylinder, the controller 15 is a control valve (controlling a speed of increasing or decreasing air pressure in the pneumatic cylinder), the temperature sensor 133 is a thermocouple, the pressing sensor 12 is a pressure sensor, and the buffer 132 is a compressible spring. When the pressing sensor 12 senses that the second die 22 moves toward the first die 21 to press the workpiece 3, the pressing sensor 12 transmits a pressing signal to the processor 11, the processor 11 enables a pneumatic cylinder to move, through the moving rod 131, the compressible spring and the thermocouple to a predetermined distance, and the predetermined distance is specified by the control valve and the pneumatic cylinder. The thermocouple moves toward the workpiece 3 to touch the workpiece 3 and sense the temperature of the workpiece 3, and transmits a temperature signal to the processor 11. The processor 11 displays the temperature value to the hot stamping die apparatus 2 after operation.

Embodiment 2: The displacement regulator 14 is a servomotor, the control device 15 is a motor driver (controlling a forward speed or a reverse speed of the servomotor), the temperature sensor 133 is a resistance thermometer, the pressing sensor 12 is a laser range finder, and the buffer 132 is a compressible spring. When the pressing sensor 12 senses that the second die 22 moves toward the first die 21 to press the workpiece 3, the pressing sensor 12 transmits a pressing signal to the processor 11. The processor 11 enables the servomotor to move, through the moving rod 131, the compressible spring and the resistance thermometer to a predetermined distance. The predetermined distance can be specified by the motor driver and the servomotor. The resistance thermometer moves toward the workpiece 3 to touch the workpiece 3 and sense the temperature of the workpiece 3, and transmits a temperature signal to the processor 11. The processor 11 displays the temperature value to the hot stamping die apparatus 2 after operation.

Figure 6:
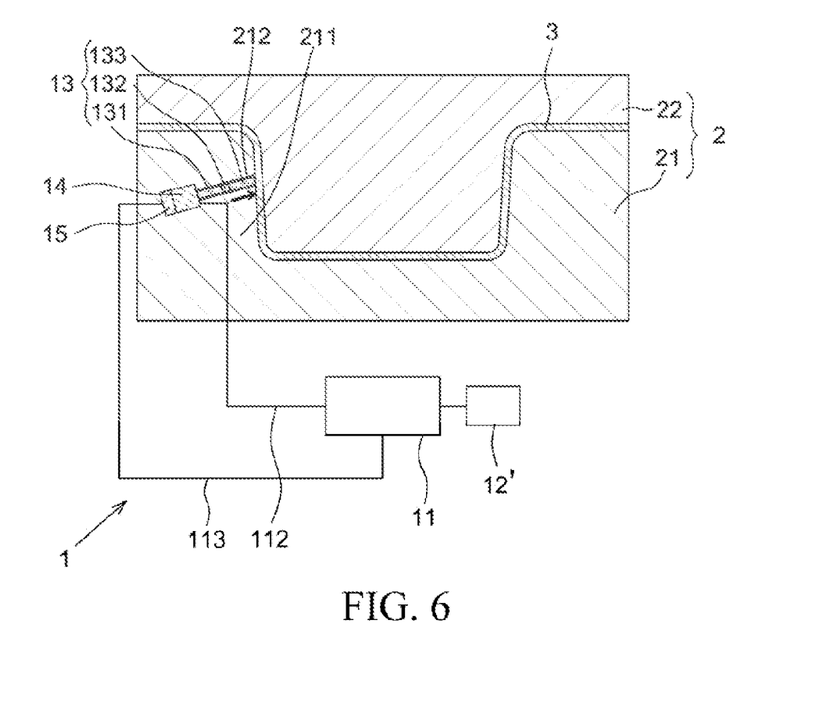
FIG. 6 is a schematic cross-sectional view of a temperature sensing device for a hot stamping die apparatus according to a second embodiment of the present disclosure after a workpiece is pressed.

FIG. 6 is a schematic cross-sectional view of a temperature sensing device for a hot stamping die apparatus according to a second embodiment of the present disclosure after a workpiece is pressed. A difference between the second embodiment and the first embodiment lies in that: the temperature sensing device 1 of the second embodiment does not need to include a pressing sensor, but further includes: a process controller 12', electrically connected to the processor. Because the process controller 12' can first calculate, in a process control manner, a distance between the second die 22 and the workpiece 3 and a moving speed of the second die 22, then obtain a time point of the second die 22 reaching the workpiece 3, and transmit a timing signal (that is, a pushing signal) to the processor 11 at the time point. After the processor 11 receives the timing signal, the processor 11 controls the displacement regulator 14 through the controller 15, so that the moving rod 131 drives the buffer 132 and the temperature sensor 133 to move a predetermined distance, and further the temperature sensor 133 moves toward the workpiece 3 to touch the workpiece 3 and sense a temperature of the workpiece 3. The process control of the process controller 12' that transmits the timing signal is a kind of open loop control, and the process controller 12' and the processor 11 can be integrated into a single processor.

The present disclosure further provides a temperature sensing method for a hot stamping die apparatus, including: providing a hot stamping die apparatus, including a first die and a second die, where the second die is configured to move to the first die relatively; transmitting a pushing signal to a processor when sensing that the second die moves toward the first die to press a workpiece; and moving, by a temperature sensor after the processor receives the pressing signal, toward the workpiece to touch the workpiece and sense a temperature of the workpiece; wherein the pushing signal is selected from a group consisting of a pressing signal of a pressing sensor and a timing signal of a process controller. In addition, after the processor receives the pushing signal, the processor controls a displacement regulator through a controller, so that the moving rod drives a buffer and the temperature sensor to move a predetermined distance.

The temperature sensing device of the present disclosure is configured to sense a temperature of the workpiece when the hot stamping die apparatus presses the workpiece, link the controller by using the pressing signal of the pressing sensor or the timing signal of the process controller, and enable, through the displacement regulator and the moving rod, a temperature sensing unit to touch the workpiece during pressing. If a moving distance of the moving rod exceeds an original distance between the temperature sensor and the workpiece, extra movement is absorbed through internal contraction of the buffer. Compared with the contact temperature sensor (the impact force borne on the contact temperature sensor is determined by pressing of the second die on the first die, and the damage rate the contact temperature sensor in a hot stamping die apparatus increases with the impact force) and a non-contact infrared temperature sensor (the emissivity change of the workpiece thereof causes a temperature measurement error problem during infrared sensing) in the prior art, a contact force between the contact temperature sensor of the present disclosure and a workpiece is controlled by using the controller and the displacement regulator each time, and the contact force of the present disclosure cannot be changed even if there is an impact force of the hot stamping die apparatus on the workpiece. Therefore, the contact temperature sensor of the present disclosure utilizes a linkage mode and has a long service life, and has precise temperature sensing values.

In conclusion, preferred implementations or embodiments of the technical means adopted by the present disclosure to resolve the problems of the present disclosure are merely recorded, and are not intended to limit the scope of implementation of the present disclosure. That is, any equivalent changes and modifications literally conforming to the scope of the claims of the present disclosure or made according to the scope of the claims of the present disclosure shall fall within the scope of the present disclosure.

What is claimed is:

1. A temperature sensing device for a hot stamping die apparatus, wherein the hot stamping die apparatus comprises a first die and a second die, the second die is configured to move to the first die relatively, and the temperature sensing device comprises:
    a processor, wherein when the second die moves toward the first die to press a workpiece, a pushing signal is transmitted to the processor;
    at least one temperature sensing unit, disposed in the first die, and comprising:
        a moving rod;
        a buffer, having an end connected to the moving rod; and
        a temperature sensor, connected to the other end of the buffer, and electrically connected to the processor, wherein the temperature sensor is located in a hole of the first die, and the temperature sensor is not exposed out from the hole of the first die;
    a displacement regulator, configured to drive the moving rod, and enable the moving rod to move to the displacement regulator relatively; and
    a controller, coupled to the displacement regulator, and electrically connected to the processor, whereby after the processor receives the pushing signal, the processor controls the displacement regulator through the controller, so that the moving rod drives the buffer and the temperature sensor to move a predetermined distance, and further the temperature sensor moves in the hole of the first die and toward the workpiece to touch the workpiece and sense a temperature of the workpiece.

2. The temperature sensing device for a hot stamping die apparatus according to claim 1, wherein the first die comprises a body and a hole, the hole is provided in the body, the hole is configured to accommodate the temperature sensing unit, after the processor receives the pushing signal, the temperature sensor moves along an interior of the hole to touch the workpiece and sense the temperature of the workpiece, and the temperature sensor is selected from a group consisting of a thermocouple, a resistance thermometer, a thermistor, and a combination thereof.

3. The temperature sensing device for a hot stamping die apparatus according to claim 1, wherein the pushing signal is a timing signal of a process controller, and the process controller is electrically connected to the processor.

4. The temperature sensing device for a hot stamping die apparatus according to claim 1, wherein the displacement regulator is selected from a group consisting of a pneumatic cylinder, a servomotor, and a combination thereof; when the displacement regulator is a pneumatic cylinder, the controller is a control valve, and the control valve is mechanically connected to the pneumatic cylinder; and when the displacement regulator is a servomotor, the controller is a motor driver, and the motor driver is electrically connected to the servomotor.

5. The temperature sensing device for a hot stamping die apparatus according to claim 1, wherein the pushing signal is a pressing signal of a pressing sensor, the pressing sensor is electrically connected to the processor, and the pressing sensor is selected from a group consisting of a laser rangefinder, a pressure sensor, an ultrasonic distance sensor, and a combination thereof.

6. The temperature sensing device for a hot stamping die apparatus according to claim 5, wherein the pressing signal is information about a distance between the second die and the first die; or the pressing signal is information about pressure of the second die on the first die.

7. The temperature sensing device for a hot stamping die apparatus according to claim 6, wherein when the pressing signal is the information about the distance between the second die and the first die, the processor transmits a processing signal to the controller in advance before the workpiece is pressed, and the controller enables the displacement regulator to move the temperature sensing unit in advance, so that the temperature sensor touches the workpiece and senses the temperature of the workpiece while pressing the workpiece.

8. The temperature sensing device for a hot stamping die apparatus according to claim 1, wherein when a distance between an initial position of the temperature sensor and the workpiece is less than a moving distance of the moving rod, extra movement is absorbed through internal contraction of the buffer.

* * * * *